Patented Sept. 16, 1941

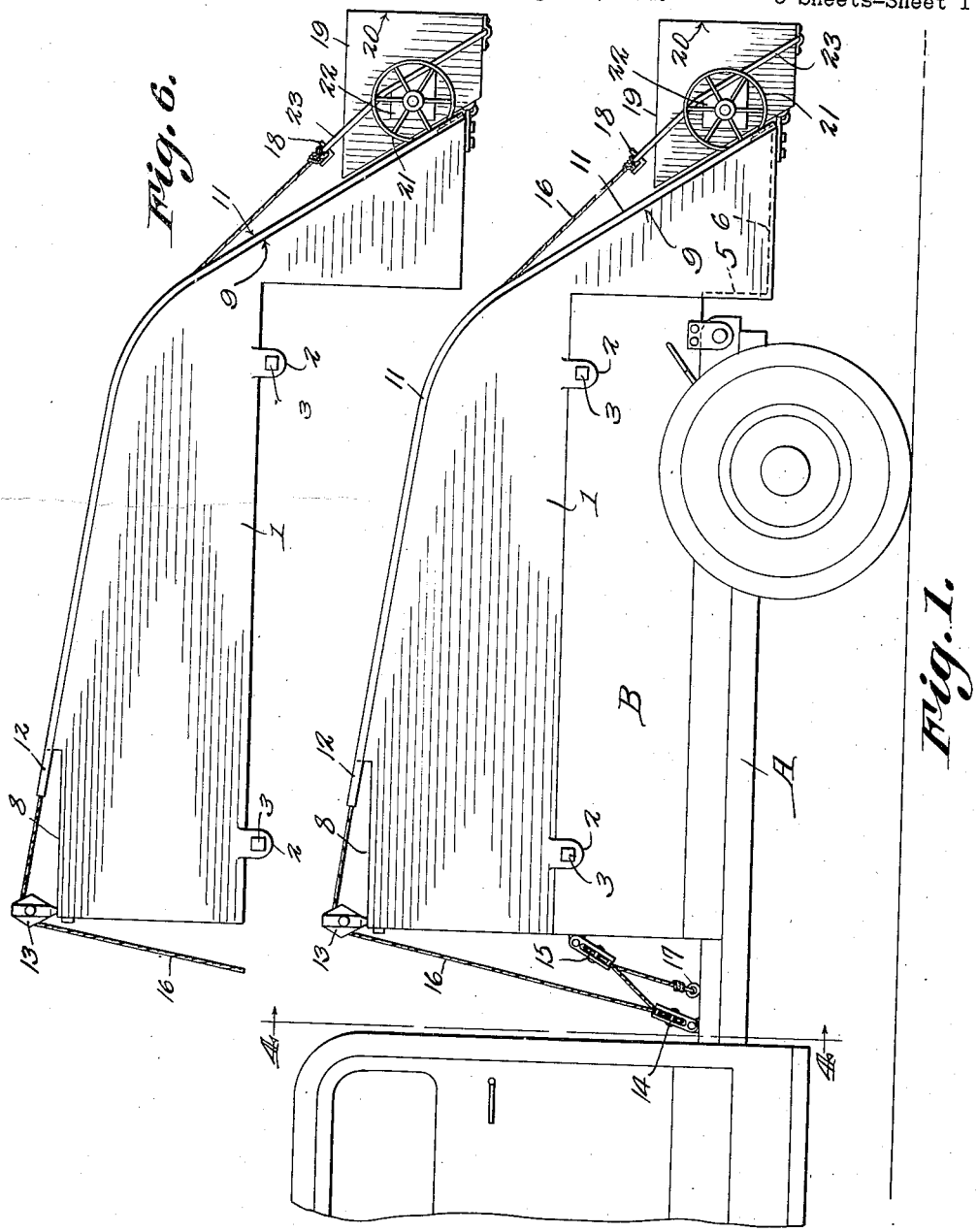

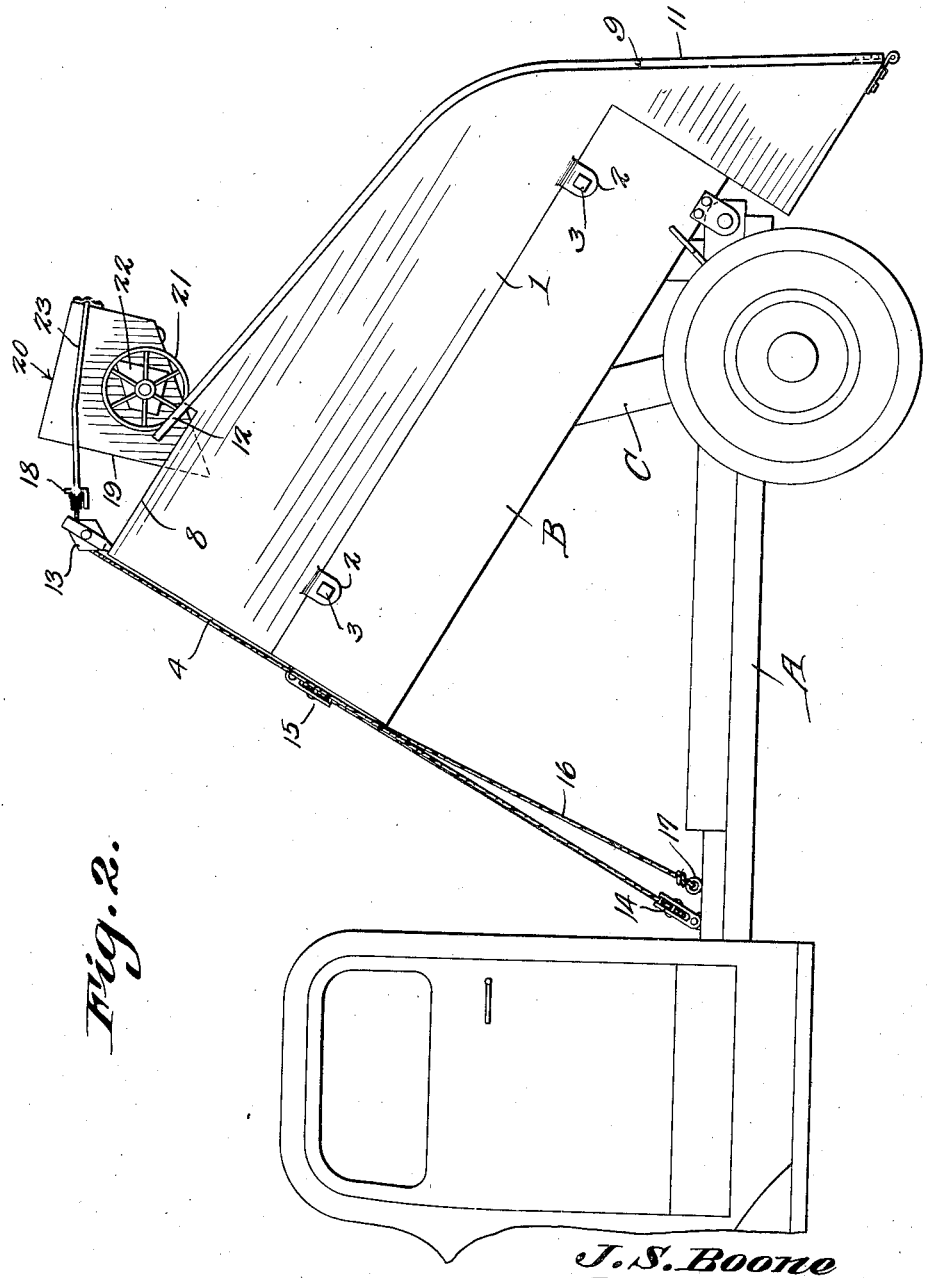

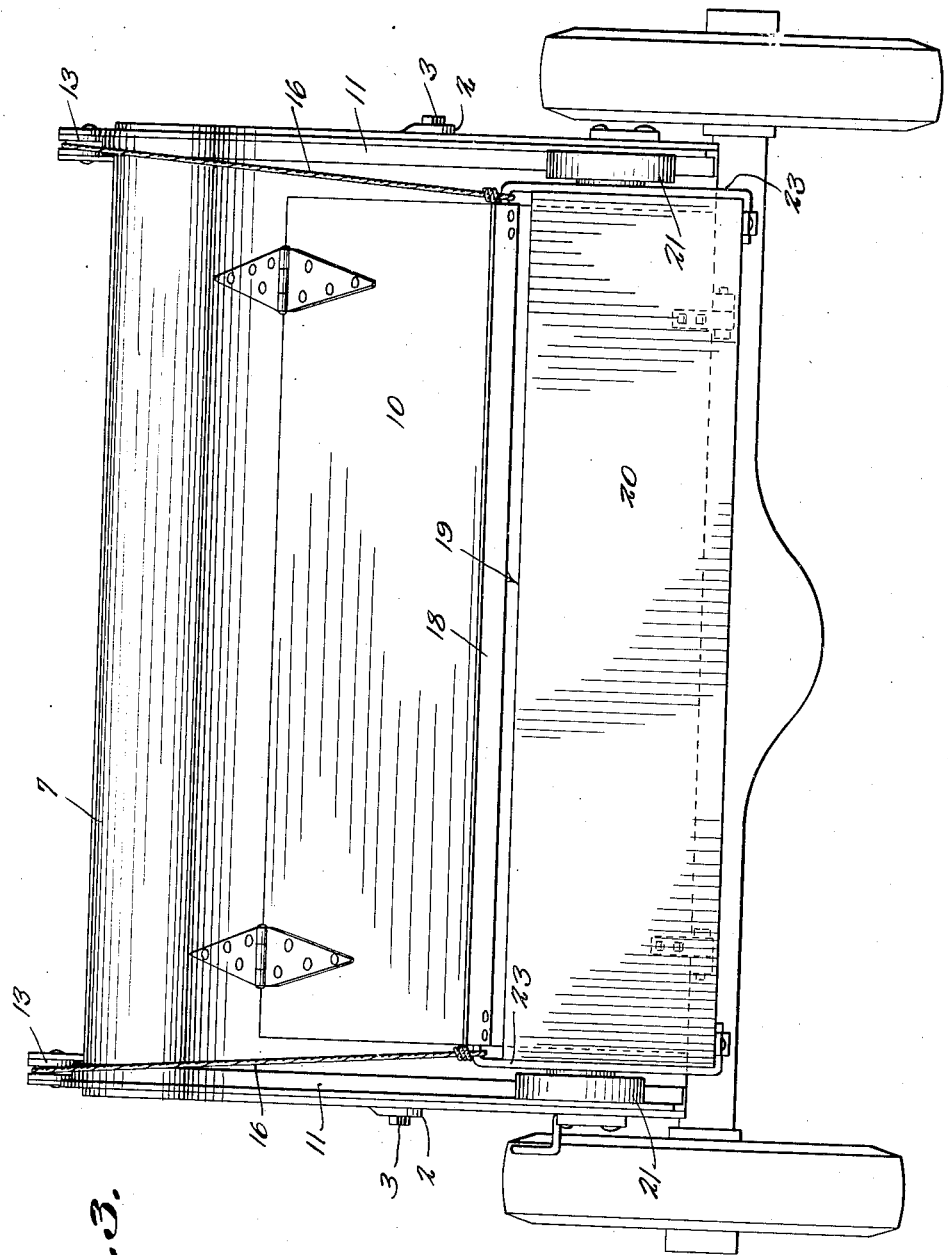

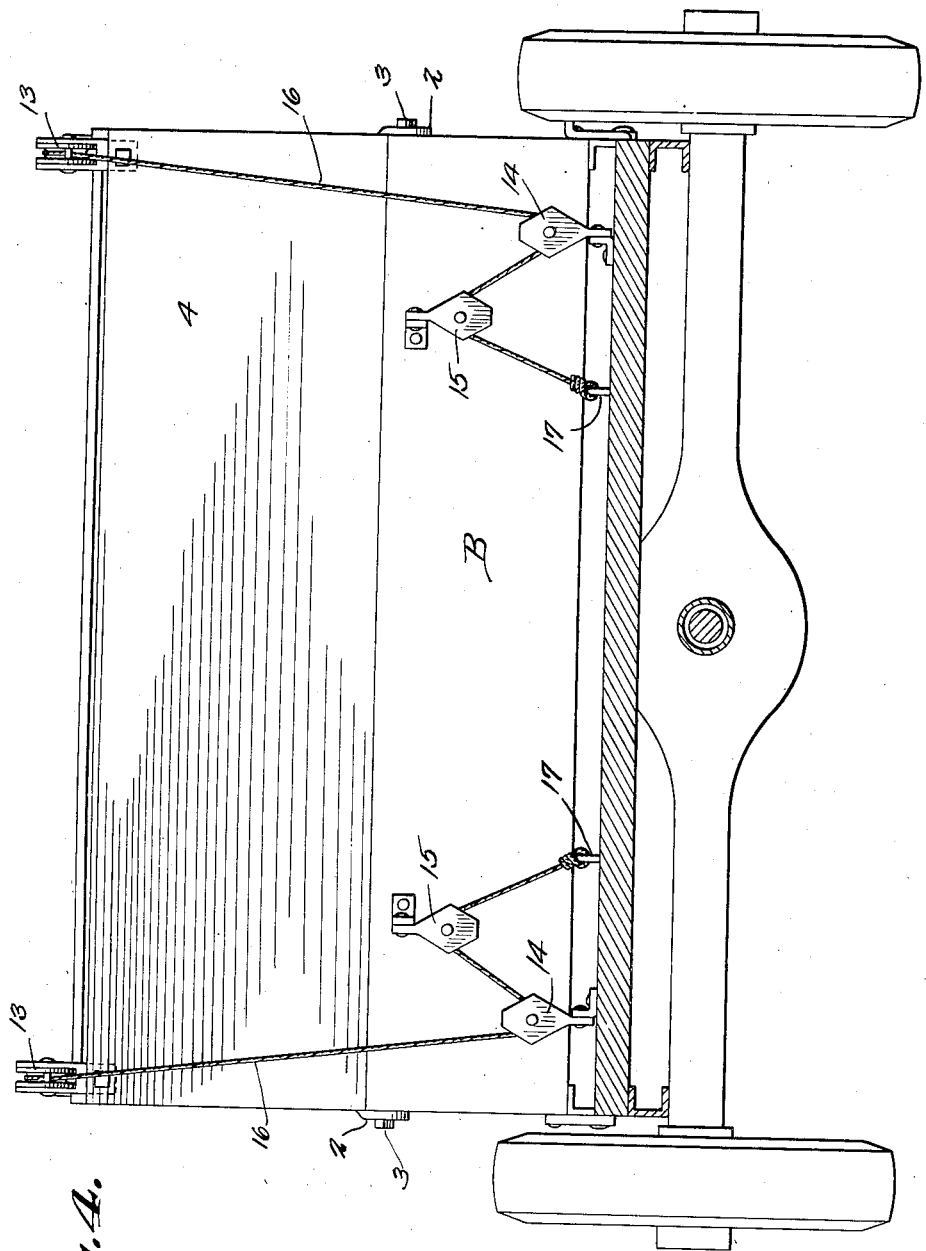

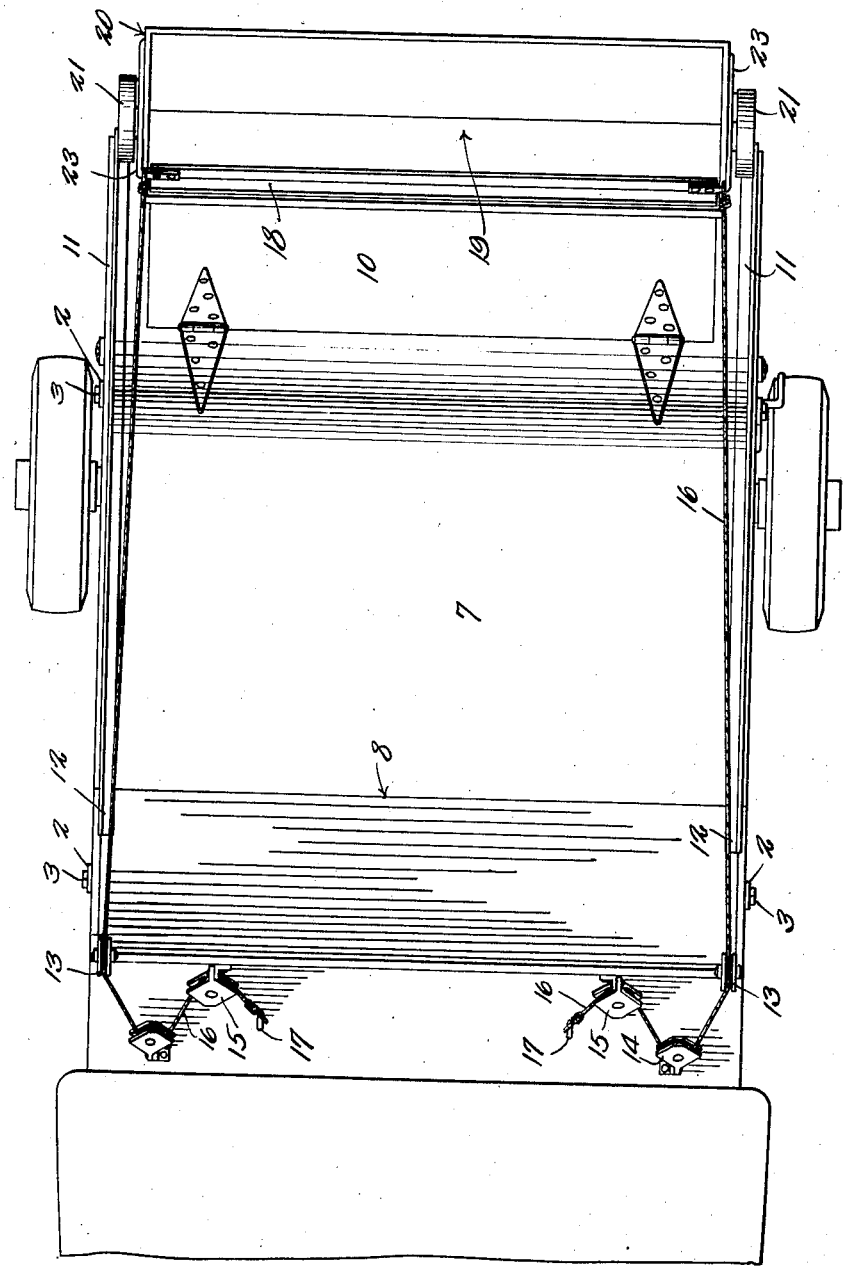

2,256,042

UNITED STATES PATENT OFFICE 2,256,042

SELF-LOADING ATTACHMENT FOR VEHICLE DUMP BODIES

John Skelton Boone and John L. Caldwell, Chapel Hill, N. C.

Application August 28, 1940, Serial No. 354,610

4 Claims. (Cl. 214—67)

This invention relates to a self-loading attachment adapted to be used in connection with the dump body of a vehicle whereby it is possible readily to deliver trash, ashes, garbage, or other waste material into the body so that all portions thereof and of the applied attachment can be completely filled, the body being subsequently emptied by dumping in the usual manner.

A further object is to utilize the movement of the body while being raised and lowered, for operating a conveyer whereby material deposited in the conveyer at a convenient point back of the truck by attendants, can be automatically carried upwardly to the inlet of the attachment, discharged thereinto while the body is in its elevated position, and subsequently returned to the point of loading when the body and attachment are lowered.

Another object is to provide an attachment of this character which is inexpensive in construction and can be applied readily to different truck bodies so that, when it is not desired to use the attachment, the trucks can be employed for other purposes, thereby reducing materially the cost of needed equipment by eliminating the necessity of employing special garbage or trash collecting trucks in addition to ordinary trucks commonly employed for other purposes.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings—

Figure 1 is a side elevation of a portion of a truck body equipped with the attachment constituting the present invention.

Figure 2 is a similar view showing the body with the attachment thereon in loading position, which is also the dumping position.

Figure 3 is a rear elevation of the structure shown in Figure 1.

Figure 4 is an enlarged section on line 4—4, Figure 1.

Figure 5 is a plan view of the structure shown in Figure 1.

Figure 6 is a side elevation of the attachment removed from the truck body.

Referring to the figures by characters of reference, A designates the chassis of a dump truck the usual body of which has been shown at B, this body being mounted to swing upwardly into dumping position by means of the usual hoisting mechanism indicated generally at C. Normally, however, the body is not in the dumping position shown in Figure 2 but is positioned on the chassis as in Figure 1.

The attachment constituting the present invention is in the form of a supplemental body having side walls 1 shaped to fit upon the top edges of the side walls of body B and against the back edges of said side walls, this attachment being secured to the truck body B in any suitable manner. For example it can be formed with ears 2 lapping the sides of the body B and detachably secured thereto by means of bolts 3 or the like. Obviously other means could be employed for this purpose.

The front of the attachment is closed by a front wall 4 adapted to rest upon the front of the body B as shown particularly in Figure 4 and that portion of the attachment extended below the back end of the body B is closed at the front and bottom as indicated at 5 and 6 respectively.

The upper edges of the side walls of attachment 1 are joined by a top wall 7 inclined downwardly and rearwardly from an inlet opening 8 which extends transversely of the attachment at the forward end of the top thereof. The top wall 7 merges into a back wall 9 extending to the bottom 6 and this back wall includes a closure 10 in the form of a hinged gate which can be held in closed position in any suitable manner.

Parallel rails 11 in the form of angle strips are secured on the back wall 9 and the top wall 7 adjacent to the sides thereof, these rails having their forward ends overlying the opening 8 as shown at 12.

Secured to the top of the forward end of attachment 1 at the sides thereof are guide sheaves 13. Another pair of sheaves 14 are secured to the chassis A in front of the body B while a third pair of sheaves 15 are secured to the front of body B above the level of the sheaves 14.

Separate cables 16 are secured at one end to chassis A as indicated at 17 and from these points of attachment the cables are extended upwardly along diverging lines over the respective sheaves 15 and thence downwardly under the respective sheaves 14 from which they are extended upwardly over the guide pulleys 13 and thence rearwardly along the top 7 to a bail 18 which straddles a carrier in the form of a bucket 19 and is pivotally connected to the bottom of said bucket adjacent to the back wall 20 thereof. This bucket has supporting wheels 21 mounted thereon at its sides and adapted to travel along the rails 11 which serve to guide the bucket in its movement along the back and top of the attachment. The axis of rotation of wheels 20 is positioned forwardly from the center of gravity of the bucket and stop blocks 22 are secured to the sides of the bucket adjacent to the wheels where they will normally bear backwardly against the sides of bail 18 so as thus to prevent the bucket from tilting backwardly or forwardly relative to the bail, attention being called to the fact that the blocks 22 present elongated faces 23 for engagement with the bail so that, as long as the bail is held substantially rigid, the blocks 22 and the bucket cannot rotate in a counter-clockwise direction relative to the wheels.

The forward wall of the bucket is inclined so as normally to lie substantially parallel with the back wall 9, as shown in Figures 1 and 6 and when the body B is in lowermost position as in Figure 1, the cables 16 are of such length as to support the bucket back of the lower portion of wall 9 where the open top of the bucket can be reached conveniently for the purpose of depositing waste material therein.

As has already been explained the attachment constituting the present invention is complete in itself and is sold as such for application to ordinary truck bodies. Under normal conditions a truck can be used for the usual purposes but if it is to be converted into a truck for collecting trash, garbage or the like, the attachment is applied thereto as shown in Figure 1, fastened to the body at 3, and the cables 16 threaded through the sheaves 14 and 15 and attached at 17 to the chassis as shown. With the parts thus joined the truck is ready for use.

As the bucket or conveyer is normally positioned at a low level back of the attachment, it can be conveniently reached by an attendant for the purpose of placing therein waste matter to be hauled away. After the bucket or carrier has been filled, the dump body B is swung upwardly by means of the usual mechanism C so as to be brought to what ordinarily would be a dumping position. By reason of the block and tackle mechanism employed, this upward swinging of the body and the attachment thereon will result in pulling the carrier upwardly along the back 9 and top 7 at which time it will be guided by the flanges of the angle strips constituting the rails 11. As the carrier travels along the rails it will be held against dumping accidentally because of the cooperation of the blocks 22 with the sides of the bail 18 but when the advancing wall of the carrier or bucket is relieved of the support offered by the inclined top of the attachment, as when the wheels 21 are brought to position on the projecting ends 12 of the rails, the bucket will then tilt forwardly and downwardly into the opening 8 so that the contents thereof will be delivered into the attachment 1 in the body B and will gravitate backwardly into the rear portion of the attachment. When body B is lowered in the usual way the weight of the carrier will cause it to gravitate back to its normal position as shown in Figure 1 whereupon the foregoing operation can be repeated. As the body is moved to an inclined position every time a charge of waste material is delivered thereinto, it will be obvious that the body and the attachment will be filled compactly from the lower or rear end upwardly and forwardly so that ultimately the structure can be completely filled. Thereafter the vehicle is driven to a point where the contents are to be dumped at which time the gate or closure 10 is released and permitted to swing open for the purpose of releasing the contents.

As the attachment 1 constitutes a housing for the top and back end of the dump body, it obviously will prevent waste material from becoming dislodged while in transit. It is to be understood of course that before this housing is applied to the body the tail-board of the body must be removed or swung down to open position into the lower rear portion of the housing.

What is claimed is:

1. The combination with the dump body of a truck, of a housing detachably joined to the body and opening into the top and back thereof, said housing having an inlet opening in its top; a track on the housing inclined upwardly from the lower portion of the back thereof to the opening, a carrier movable along the track and normally supported on the back portion thereof, and means operated by the upward movement of the dump body for moving the carrier along the track and upwardly to the opening, said means including a bail pivotally connected to the carrier, flexible elements connected at one end to the bail and extended over the housing, said elements being anchored at their other end, and fixed and movable sheaves about which said elements are looped, the movable sheaves being mounted on the body.

2. The combination with the dump body of a truck, of a housing detachably joined to the body and opening into the top and back thereof, said housing having an inlet opening in its top, a track on the housing inclined upwardly from the lower portion of the back thereof to the opening, a carrier movable along the track and normally supported on the back portion thereof, and means operated by the upward movement of the dump body for moving the carrier along the track and upwardly to the opening, said means including a bail pivotally connected to the carrier, supporting wheels on the carrier and mounted on the track, means on the carrier and cooperating with the bail for holding the bail and carrier against relative movement, cables anchored at one end and connected to the bail at their other end, and fixed and movable sheaves mounted for cooperation with the cables to move the carrier along the track to the inlet opening when the body and housing are moved upwardly.

3. An attachment for the body of a dump truck, including a housing open at the bottom and having an inlet opening in the top at one end, a track extending along the top of the housing from the back end thereof to the opening, said track having its forward end overlying the opening, means for attaching the housing on an open truck body to cover the top and back end thereof, a wheel-supported bucket mounted to travel along the track, a bail embracing and pivotally connected to the bucket, an operating cable connected to the bail and extending longitudinally over the housing, means for anchoring the cable to the chassis of a truck, fixed and movable means cooperating with the cable, when anchored, for pulling the bucket longitudinally along the track and onto the overhanging portion of the track when the dump body is moved to dumping position, and means on the bucket and cooperating with the bail for holding the bucket and bail against relative movement while the bucket is traveling toward and from the opening.

4. The combination with a truck chassis, of a dump body mounted thereon for upward and backward tilting, said body having an opening in the forward portion of the top thereof, a track on the body leading thereover from the bottom of the back end to a point adjacent to the opening, a carrier normally positioned on the track at the back end of the body for receiving material to be handled, and means controlled by the upward and rearward swinging of the forward end of the body for moving the carrier off of the back end of the body and along the track to the opening.

JOHN SKELTON BOONE.
JOHN LIVINGSTON CALDWELL.